US012596952B2

(12) United States Patent
Griffin et al.

(10) Patent No.: US 12,596,952 B2
(45) Date of Patent: Apr. 7, 2026

(54) QUANTUM RESOURCE ACCESS CONTROL THROUGH CONSENSUS

(71) Applicant: Red Hat, Inc., Raleigh, NC (US)

(72) Inventors: Leigh Griffin, Waterford (IE); Adam Piasecki, Dublin (IE)

(73) Assignee: Red Hat, LLC, Raleigh, NC (US)

( * ) Notice: Subject to any disclaimer, the term of this patent is extended or adjusted under 35 U.S.C. 154(b) by 358 days.

(21) Appl. No.: 18/352,783

(22) Filed: Jul. 14, 2023

(65) Prior Publication Data

US 2025/0148340 A1     May 8, 2025

(51) Int. Cl.
| | |
|---|---|
| *G06F 3/00* | (2006.01) |
| *G06F 21/62* | (2013.01) |
| *G06N 10/40* | (2022.01) |
| *G06N 10/60* | (2022.01) |

(52) U.S. Cl.
CPC ......... *G06N 10/60* (2022.01); *G06F 21/6218* (2013.01); *G06N 10/40* (2022.01)

(58) Field of Classification Search
CPC ....................................................... G06F 9/50
See application file for complete search history.

(56) References Cited

U.S. PATENT DOCUMENTS

| | | | | | |
|---|---|---|---|---|---|
| 9,384,827 | B1 * | 7/2016 | Reohr | ................. | G11C 11/1655 |
| 11,477,015 | B1 | 10/2022 | Smith et al. | | |
| 2018/0365585 | A1 * | 12/2018 | Smith | ..................... | G06F 9/546 |

| | | | | | |
|---|---|---|---|---|---|
| 2021/0049482 | A1 * | 2/2021 | Mezzacapo | .............. | G06N 5/04 |
| 2021/0304218 | A1 * | 9/2021 | Bahrami | ................. | H04L 63/08 |
| 2022/0237495 | A1 * | 7/2022 | Yohannes | .............. | G06N 10/20 |
| 2022/0321334 | A1 | 10/2022 | McCarty et al. | | |
| 2022/0417168 | A1 * | 12/2022 | Lee | ................... | H04W 72/0446 |
| 2023/0020797 | A1 | 1/2023 | Griffin et al. | | |
| 2023/0153219 | A1 * | 5/2023 | Krneta | ................ | G06F 11/3495 |
| | | | | | 709/224 |
| 2023/0196176 | A1 * | 6/2023 | Khammassi | ........... | G06N 10/00 |
| | | | | | 712/227 |

OTHER PUBLICATIONS

Miralem Mehic, Quantum Key Distribution: A Networking Perspective. (Year: 2020).*
Cai, Zhengying, et al., "A Blockchain Smart Contract Based On Light-weighted Quantum Blind Signature," IEEE Access, DOI 10.1109/ACCESS.2019.2941153, vol. XX, 2017, 13 pages.

(Continued)

*Primary Examiner* — Lechi Truong
(74) *Attorney, Agent, or Firm* — Dority & Manning, P.A.

(57)     ABSTRACT

A quantum computing system determines that a quantum process seeks access to a quantum resource implemented by the quantum computing system. It is determined that a particular contract of a plurality of contracts governs access to the quantum resource, the contract identifying a condition of the quantum computing system that is to be met prior to granting access to the quantum resource. Information is sent to a plurality of computing devices indicating that the quantum process seeks access to the quantum resource. Condition determinations are received from the computing devices, each condition determination indicating whether the condition is met. Access to the quantum resource is granted or denied based at least in part on the plurality of condition determinations.

18 Claims, 4 Drawing Sheets

(56) References Cited

OTHER PUBLICATIONS

Coladangelo, Andrea, "Smart contracts meet quantum cryptography," arXiv: 1902.05214v2 [quant-ph], Jul. 2, 2019, 23 pages.

Li, Chuntang, et al., "Quantum Blockchain: A Decentralized, Encrypted and Distributed Database Based on Quantum Mechanics," Journal of Quantum Computing, vol. 1, No. 2, doi:10.32604/jqc.2019. 06715, 2019, 15 pages.

Sun, Xin, et al., "Quantum Logics for Access Control in Cloud Computing and Blockchain," https://www.researchgate.net/publication/ 326450490, Studia Logica, 2018, 29 pages.

* cited by examiner

QUANTUM RESOURCE ACCESS CONTROL THROUGH CONSENSUS

BACKGROUND

A quantum computing system may receive quantum instruction files for scheduling and execution from a plurality of classical computing devices. The quantum computing system determines when a scheduled quantum instruction file should be executed as a quantum process, and then returns the results of the execution of the quantum process to the submitting classical computing system.

SUMMARY

The examples disclosed herein implement quantum resource access control through consensus.

In one example a method is provided. The method includes determining, by a quantum resource validator executing on a quantum computing system, that a quantum process seeks access to a quantum resource implemented by the quantum computing system. The method further includes determining, by the resource validator, that a particular contract of a plurality of contracts governs access to the quantum resource, the contract identifying a condition of the quantum computing system that is to be met prior to granting access to the quantum resource. The method further includes sending, by the resource validator to a plurality of computing devices, information indicating that the quantum process seeks access to the quantum resource. The method further includes receiving, by the resource validator, from the plurality of computing devices, a corresponding plurality of condition determinations, each condition determination indicating whether the condition is met. The method further includes granting or denying access to the quantum resource based at least in part on the plurality of condition determinations.

In another example a quantum computing system is provided. The quantum computing system includes a memory, and a processor device coupled to the memory. The processor device is to determine that a quantum process seeks access to a quantum resource implemented by the quantum computing system. The processor device is further to determine that a particular contract of a plurality of contracts governs access to the quantum resource, the contract identifying a condition of the quantum computing system that is to be met prior to granting access to the quantum resource. The processor device is further to send, to a plurality of computing devices, information indicating that the quantum process seeks access to the quantum resource. The processor device is further to receive, from the plurality of computing devices, a corresponding plurality of condition determinations, each condition determination indicating whether the condition is met. The processor device is further to grant or deny access to the quantum resource based at least in part on the plurality of condition determinations.

In another example a non-transitory computer-readable storage medium is provided. The non-transitory computer-readable storage medium includes executable instructions to cause a quantum computing system to determine that a quantum process seeks access to a quantum resource implemented by the quantum computing system. The instructions further cause the quantum computing system to determine that a particular contract of a plurality of contracts governs access to the quantum resource, the contract identifying a condition of the quantum computing system that is to be met prior to granting access to the quantum resource. The instructions further cause the quantum computing system to send, to a plurality of computing devices, information indicating that the quantum process seeks access to the quantum resource. The instructions further cause the quantum computing system to receive, from the plurality of computing devices, a corresponding plurality of condition determinations, each condition determination indicating whether the condition is met. The instructions further cause the quantum computing system to grant or deny access to the quantum resource based at least in part on the plurality of condition determinations.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
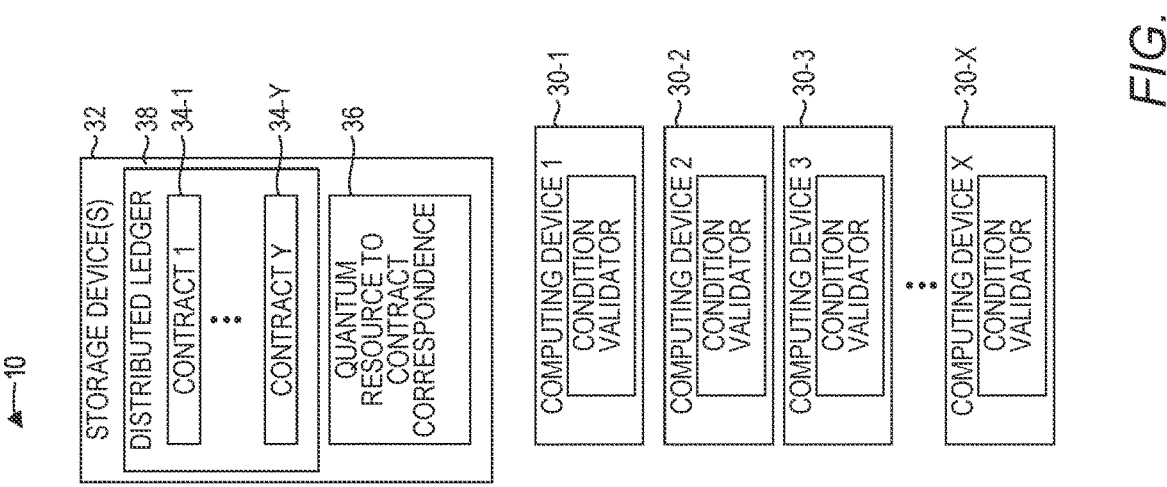
FIG. 1 is a block diagram of an environment in which quantum resource access control through consensus can be practiced according to some implementations.
Figure 1:
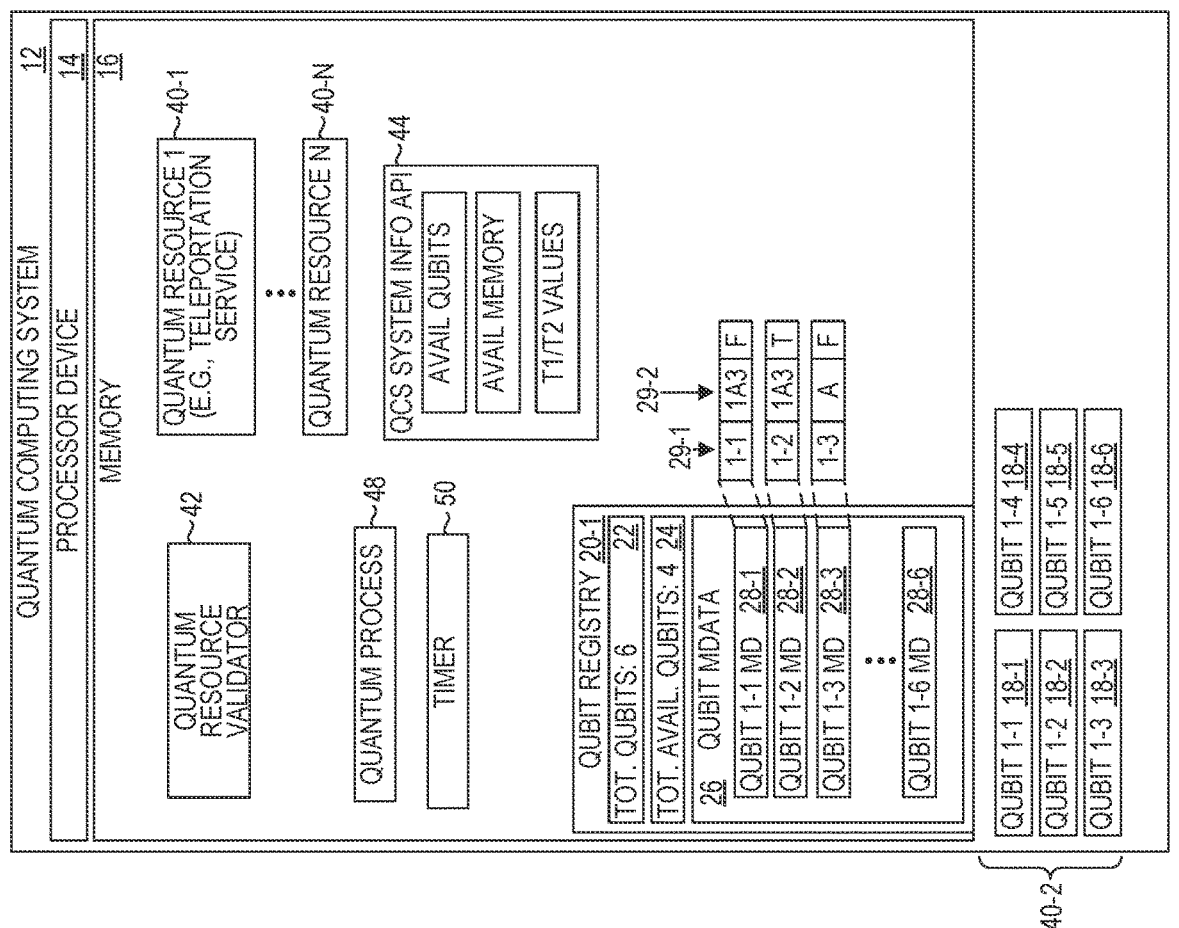

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Due to the limited numbers of quantum computing systems, quantum computing systems are typically relatively highly utilized. Often a quantum computing system services a group of classical computing devices that send to the quantum computing system quantum program instruction files for scheduling and execution. The quantum computing system returns the results of the execution to the classical computing device that submitted the instruction file.

In such a multi-user environment, it may be desirable to limit access to quantum resources unless certain conditions of the quantum computing system exist. This may be, for example, because granting access to such quantum resources in the absence of such conditions may negatively impact other executing quantum processes.

The examples disclosed herein implement quantum resource access control through consensus. In particular, a quantum resource validator executing on a quantum computing system determines that a quantum process seeks access to a quantum resource implemented by the quantum computing system. The resource validator determines that a particular contract governs access to the quantum resource. The contract identifies a condition of the quantum computing system that is to be met prior to granting access to the quantum resource. The resource validator determines whether the condition is met and sends the condition to a plurality of other computing devices. The other computing devices make condition determinations indicating whether the condition is met and send the condition determinations to the resource validator. Based on the condition determinations, the resource validator grants or denies access to the quantum resource.

FIG. 1 is a block diagram of an environment 10 in which examples disclosed herein may be practiced. The environment 10 includes a quantum computing system 12 which operates in a quantum environment but can operate using classical computing principles or quantum computing principles. When using quantum computing principles, the quantum computing system 12 performs computations that utilize quantum-mechanical phenomena, such as superposition and entanglement. The quantum computing system 12 may operate under certain environmental conditions, such as at or near 0° Kelvin. When using classical computing principles, the quantum computing system 12 utilizes binary digits that have a value of either 1 or 0.

The quantum computing system 12 includes at least one processor device 14 and at least one memory 16. The quantum computing system 12 implements six qubits 18-1-18-6 (generally, qubits 18). The quantum computing system 12 includes a qubit registry 20-1 which maintains information about the qubits 18-1-18-6, including, by way of non-limiting example, a total qubits counter 22 that maintains count of the total number of qubits 18 implemented by the quantum computing system 12, and a total available qubits counter 24 that maintains count of the total number of qubits 18 that are currently available for allocation.

The qubit registry 20-1 also maintains qubit metadata 26, which comprises a plurality of qubit registry records 28-1-28-6, each of which maintains information about a corresponding qubit 18-1-18-6, such as, by way of non-limiting example, a field 29-1 that contains an identifier of the corresponding qubit 18-1-18-6, and a field 29-2 that identifies whether the qubit 18 is available for use ("A") or is in use by a particular quantum process, and if the latter, the quantum process ID of the quantum process that is currently using the corresponding qubit 18-1-18-6.

The quantum computing system 12 is capable of initiating a plurality of different quantum processes. The term "quantum process" as used herein refers to a process that executes on the quantum computing system 12 and that accesses one or more of the qubits 18-1-18-6 and provides some desired functionality. Each quantum process is implemented via a corresponding quantum instruction file that comprises quantum programming language instructions.

The environment 10 also includes a plurality of computing devices 30-1-30-X (generally, computing devices 30). There may be fewer than ten computing devices 30, greater than ten, or greater than one hundred. The computing devices 30 may be classical computing devices or quantum computing systems. The computing devices 30 may each be capable of submitting a quantum instruction file to the quantum computing system 12 for scheduling and execution.

The quantum computing system 12 and the computing devices 30 may be in communication with a storage device 32. The storage device 32 maintains a plurality of records, referred to herein as contracts 34-1-34-Y (generally, contracts 34), each of which corresponds to a particular quantum resource, such as a qubit, a quantum service, a teleportation service, or the like. The storage device 32 also maintains a data structure 36 that correlates particular quantum resources to particular corresponding contracts 34.

Each contract 34 identifies one or more conditions that are to be met before a quantum resource will be allocated to a requesting quantum process. The conditions are based on current, real-time aspects of the quantum computing system 12, such as a current temperature of the quantum computing system 12, a current amount of available random access memory, a current noise level of the quantum computing system 12, current T1/T2 levels of the quantum computing system 12, a quantity of active processes and the like. Each contract 34 identifies at least one condition. A condition includes a metric or characteristic of the quantum computing system 12, and a value or range of values that the metric or characteristic is to be compared to determine whether the condition is met or not met. For example, if the contract 34-1 corresponds to the quantum resource qubits, the condition may be that the number of available qubits, after allocation of the requested number of qubits, be greater than two. If, after the allocation of the requested qubits, the number of available qubits would be less than two, then the condition would not be met. If, after the allocation of the requested qubits, the number of available qubits would be greater than two, then the condition would be met. As another example, if the contract 34-Y governs the use of a qubit teleportation service, the condition may be that a particular noise level be below an identified noise threshold.

A contract 34 may also identify a particular validation threshold that indicates a consensus level that is to be met prior to determining that access be granted to a quantum resource. As an example, the contract 34-1 may indicate that 100% consensus is required, or that 80% consensus is required. A contract 34 may also indicate a period of time within which consensus is to be determined, such as 5 milliseconds (ms), 20 ms, or the like, to ensure that a failure of a computing device 30 to relatively quickly respond with a condition determination does not inhibit the allocation of a quantum resource. In some examples, the contracts 34 may be part of a distributed ledger 38, such as a blockchain, and the contracts 34 may be smart contracts.

The quantum computing system 12 implements a plurality of quantum resources 40-1-40-Y, generally quantum resources 40, which may be any resource of the quantum computing system 12 that a quantum process may need to access during execution of the quantum process, such as the qubits 18, quantum services such as a qubit teleportation service, or the like. The quantum computing system 12 includes a quantum resource validator 42 that, as will be discussed in greater detail below, determines whether a consensus has been met to grant access of a quantum resource to a quantum process.

The quantum computing system 12 also includes a quantum computing system information (QSI) application programming interface (API) 44. The QSI API 44 can be invoked by the quantum resource validator 42 and the computing devices 30 to obtain current, real-time metrics and characteristics of the quantum computing system 12 to thereby determine whether a condition has been met.

As an example of quantum resource access control through consensus, assume that the computing device 30-1 submits a quantum instruction file for execution to the quantum computing system 12. The quantum computing system 12 may initially place the quantum instruction file in a queue of quantum instruction files. Eventually, the quantum computing system 12 begins initiation of the quantum instruction file as a quantum process 48. The quantum process 48 may request two qubits 18. Any request for a quantum resource is intercepted by or otherwise provided to the quantum resource validator 42 prior to providing the quantum resource to the requestor, in this example the quantum process 48.

The quantum resource validator 42 determines that the request is for two qubits 18. In one implementation, the quantum resource validator 42 accesses the data structure 36 and determines that the contract 34-1 governs access to the qubits 18. The contract 34-1 includes two conditions. A first condition is that, after allocation of the requested qubits 18, there must remain two qubits 18 available for allocation. A second condition is that the temperature of the quantum computing system 12 must be below an identified threshold value. The contract 34 indicates that a consensus of 75% of the computing devices 30 that respond within 100 ms must be met to grant the request.

The quantum resource validator 42 invokes the QSI API 44 to obtain the current temperature of the quantum computing system 12 and the number of available qubits 18. The quantum resource validator 42 determines that the temperature of the quantum computing system 12 is below the threshold value. The quantum resource validator 42 determines that there are currently four available qubits 18 and that, thus, after allocation of the two requested qubits, there will be two available qubits 18 remaining, and that, thus, that the temperature condition and the available qubits condition are met.

The quantum resource validator 42 sends, to each computing device 30, a message that indicates a quantum process is requesting two qubits 18. The message may also provide a contract identifier of the contract 34-1, or the computing devices 30 may access the data structure 36 to determine that the contract 34-1 governs access to the qubits 18. The quantum resource validator 42 sets a timer 50 to expire after 100 ms.

Within the designated 100 ms, one or more of the computing devices 30 may then invoke the QSI API 44 and obtain the current temperature of the quantum computing system 12 and the current value of the total available qubits counter 24. The computing devices 30, based on the information obtained from the QSI API 44 and the conditions in the contract 34-1, respond to the message with a condition determination that indicates whether the conditions have been met. After the timer 50 expires, the quantum resource validator 42 reviews the condition determinations received from the computing devices 30 and the condition determination made by the quantum resource validator 42. In this example, 80% of the condition determinations indicate that the condition has been met. In response, the quantum resource validator 42 allows the request for the two qubits 18 to be processed by the qubit registry 20.

In another implementation, the quantum resource validator 42 may not make a condition determination and may rely solely on the condition determinations of the computing devices 30.

Where the distributed ledger 38 comprises a blockchain, the contracts 34 may comprise smart contracts that, once the conditions are met, can be executed to provide an output, such as a token, that indicates the quantum process 48 is to be provided access to the qubits 18. In this implementation, the quantum resource validator 42 may store each smart contract 34 in the distributed ledger 38. When the quantum process 48 requests access to the qubits 18, the quantum resource validator 42 stores a record in the distributed ledger 38 that identifies the quantum process 48 and that includes the condition determination of the quantum resource validator 42. Each computing device 30 receives a notification of the record and makes its own condition determination. If the conditions identified in the smart contract 34-1 are met, the smart contract 34-1 is executed, and information may be sent to the quantum resource validator 42 indicating that the qubits 18 should be allocated to the quantum process 48.

It is noted that, because the quantum resource validator 42 is a component of the quantum computing system 12, functionality implemented by the quantum resource validator 42 may be attributed to the quantum computing system 12 generally. Moreover, in examples where the quantum resource validator 42 comprises software instructions that program the processor device 14 to carry out functionality discussed herein, functionality implemented by the quantum resource validator 42 may be attributed herein to the processor device 14.

Figure 2:
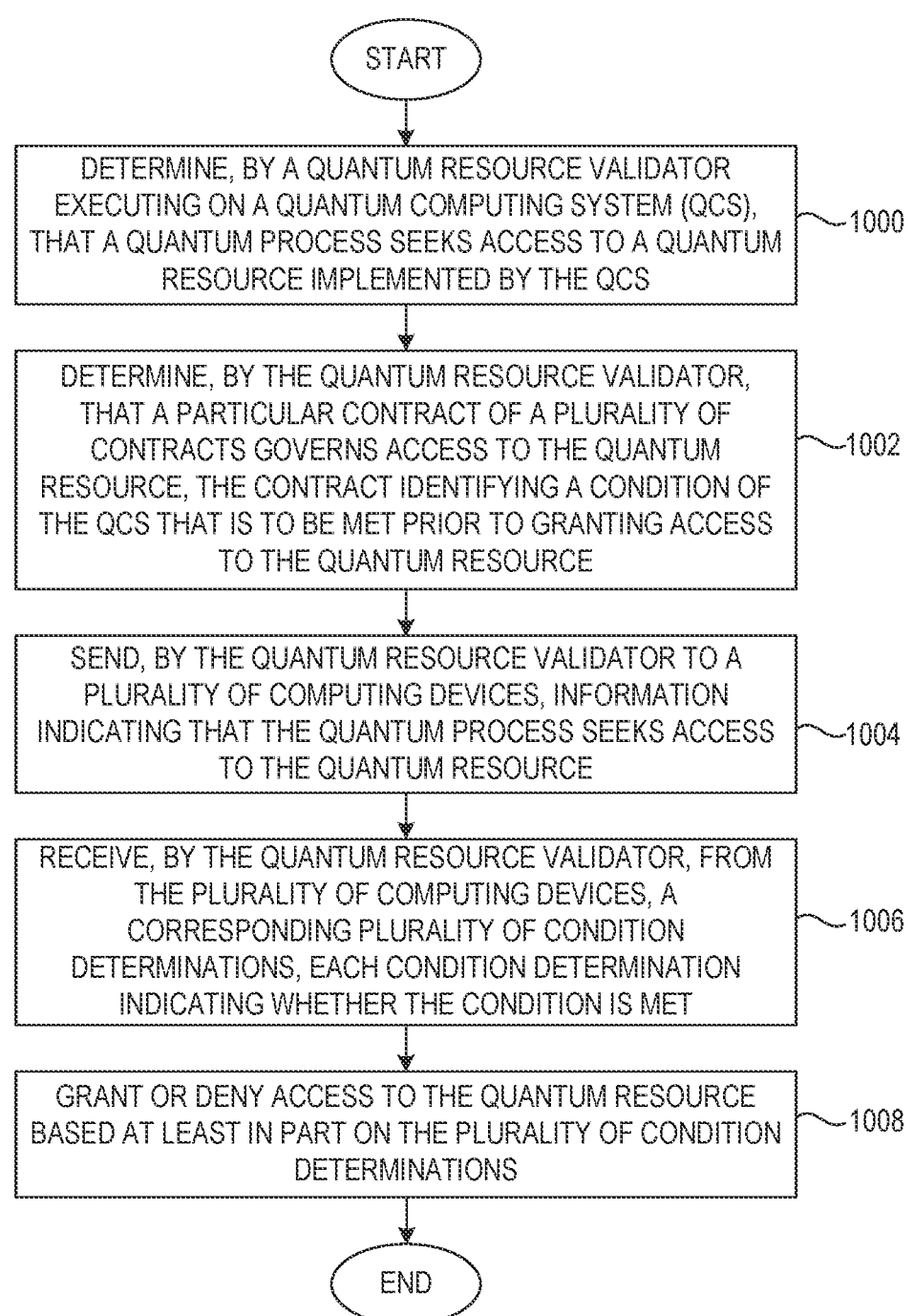
FIG. 2 is a flowchart of a method for quantum resource access control through consensus according to one implementation.

FIG. 2 is a flowchart of a method for quantum resource access control through consensus according to one implementation. The quantum resource validator 42 determines that the quantum process 48 seeks access to a quantum resource, such as the qubits 18, implemented by the quantum computing system 12 (FIG. 2, block 1000). The quantum resource validator 42 determines that the particular contract 34-1 of the plurality of contracts 34-1-34-Y governs access to the quantum resource, the contract 34-1 identifying a condition of the quantum computing system 12 that is to be met prior to granting access to the quantum resource (FIG. 2, block 1002). The quantum resource validator 42 sends, to the plurality of computing devices 30-1-30-X, information indicating that the quantum process seeks access to the quantum resource (FIG. 2, block 1004). The quantum resource validator 42 receives, from the plurality of computing devices 30-1-30-X a corresponding plurality of condition determinations, each condition determination indicating whether the condition is met (FIG. 2, block 1006). The quantum resource validator 42 grants or denies access to the quantum resource based at least in part on the plurality of condition determinations (FIG. 2, block 1008).

Figure 3:
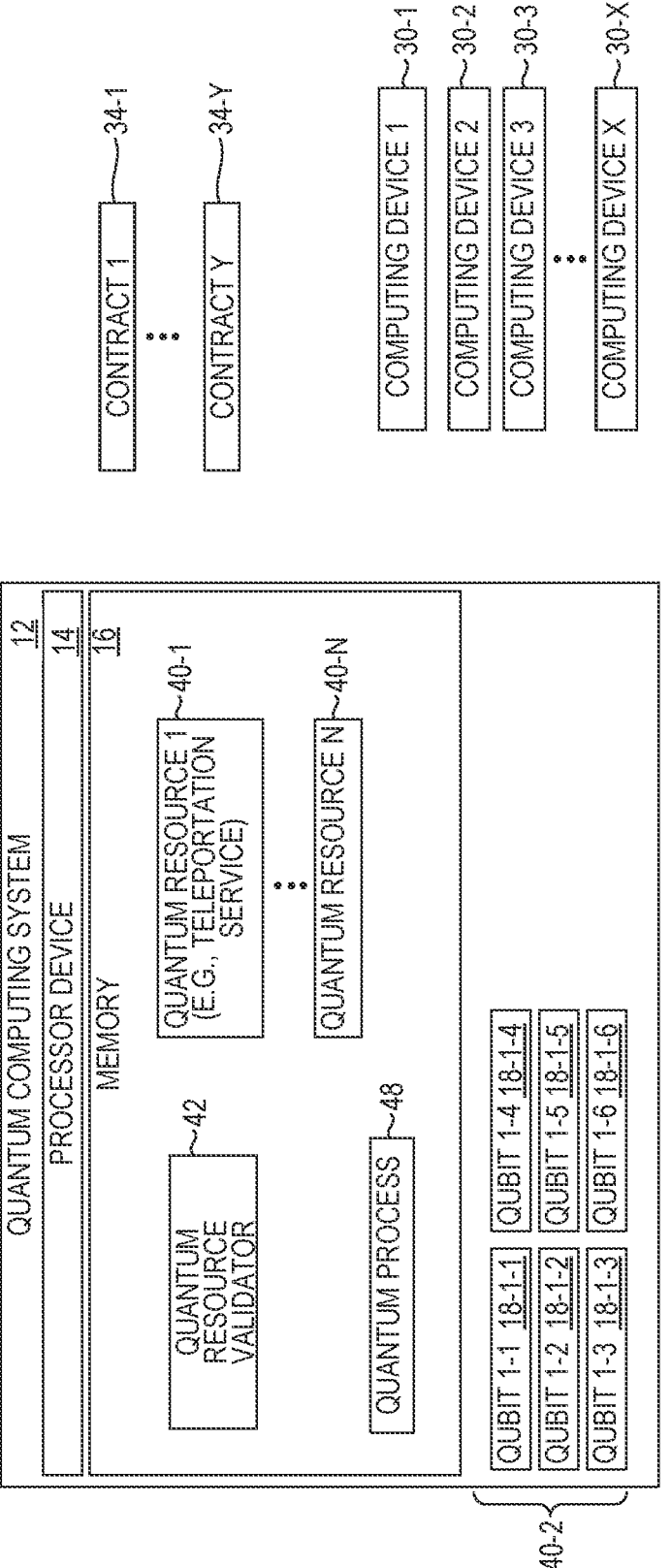
FIG. 3 is simplified block diagram of the environment illustrated in FIG. 1 according to one implementation.

FIG. 3 is a simplified block diagram of the environment 10 illustrated in FIG. 1 according to one implementation. The environment 10 includes the quantum computing system 12, which in turn includes the processor device 14 coupled to the memory 16. The processor device 14 is to determine that the quantum process 48 seeks access to a quantum resource 40 implemented by the quantum computing system 12. The processor device 14 is also to determine that the particular contract 34-1 of the of plurality of contracts 34-1-34-Y governs access to the quantum resource 40, the contract 34-1 identifying a condition of the quantum computing system 12 that is to be met prior to granting access to the quantum resource 40. The processor device 14 is further to send, to the plurality of computing devices 30-1-30-X, information indicating that the quantum process 48 seeks access to the quantum resource 40. The processor device 14 is to receive, from the plurality of computing devices 30, a corresponding plurality of condition determinations, each condition determination indicating whether the condition is met. The processor device 14 is to grant or deny access to the quantum resource 40 based at least in part on the plurality of condition determinations.

Figure 4:
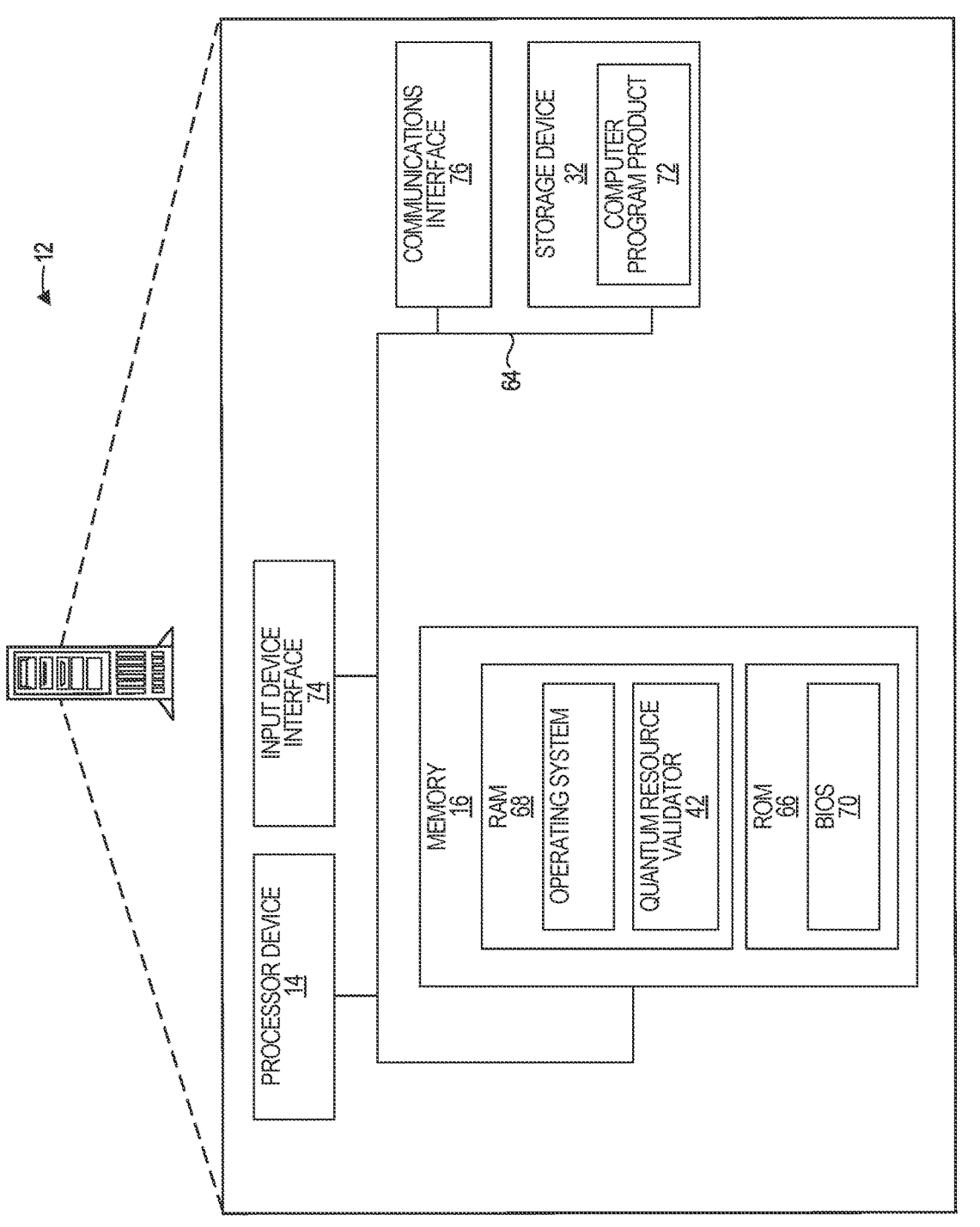
FIG. 4 is a block diagram of a quantum computing system suitable for implementing quantum resource access control through consensus according to one implementation.

FIG. 4 is a block diagram of the quantum computing system 12 suitable for implementing examples according to one example. The quantum computing system 12 may comprise any quantum computing or electronic device capable of including firmware, hardware, and/or executing software instructions to implement the functionality described herein. The quantum computing system 12 includes the processor device 14, the system memory 16, and a system bus 64. The system bus 64 provides an interface for system components including, but not limited to, the system memory 16 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the quantum computing system 12. The volatile memory 68 may also include a high-speed RAM, such as static RAM, for caching data.

The quantum computing system 12 may further include or be coupled to a non-transitory computer-readable storage medium such as the storage device 32, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 32 and other drives associated with computer-readable media and computer-usable media may provide non-volatile storage of data, data structures, computer-executable instructions, and the like.

A number of modules can be stored in the storage device 32 and in the volatile memory 68, including an operating system and one or more program modules, such as the quantum resource validator 42, which may implement the functionality described herein in whole or in part. All or a portion of the examples may be implemented as a computer program product 72 stored on a transitory or non-transitory computer-usable or computer-readable storage medium, such as the storage device 32, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the quantum resource validator 42 in the volatile memory 68, may serve as a controller, or control system, for the quantum computing system 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 74 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The quantum computing system 12 may also include a communications interface 76 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

determining, by a quantum resource validator executing on a quantum computing system, that a quantum process seeks access to a quantum resource implemented by the quantum computing system;

determining, by the quantum resource validator, that a particular contract of a plurality of contracts governs access to the quantum resource, the particular contract identifying a condition of the quantum computing system that is to be met prior to granting access to the quantum resource, wherein determining that the particular contract of the plurality of contracts governs access to the quantum resource comprises accessing a data structure that correlates ones of a plurality of quantum resources to ones of the plurality of contracts;

sending, by the quantum resource validator to a plurality of computing devices, information indicating that the quantum process seeks access to the quantum resource;

receiving, by the quantum resource validator from the plurality of computing devices, a corresponding plurality of condition determinations, each condition determination indicating whether the condition is met; and granting or denying access to the quantum resource based at least in part on the plurality of condition determinations.

2. The method of claim 1 wherein the quantum resource comprises a quantity of qubits.

3. The method of claim 1 wherein the quantum resource comprises a quantum service.

4. The method of claim 3 wherein the quantum service comprises a teleportation service.

5. The method of claim 1 wherein the quantum resource is a plurality of qubits, and wherein the condition indicates that a quantity of qubits remains available subsequent to allocating the plurality of qubits.

6. The method of claim 1 wherein the particular contract comprises a smart contract stored in a blockchain available to the quantum computing system and to each of the plurality of computing devices.

7. The method of claim 1 wherein the condition comprises one or more of a T1/T2 noise threshold, a quantum computing system temperature threshold, an amount of available random access memory, or a quantity of active processes.

8. The method of claim 1 wherein granting or denying access to the quantum resource based at least in part on the plurality of condition determinations further comprises:

determining, by the quantum resource validator, that each condition determination of the plurality of condition determinations indicates that the condition is met; and granting access to the quantum resource.

9. The method of claim 1 wherein granting or denying access to the quantum resource based at least in part on the plurality of condition determinations further comprises:

determining, by the quantum resource validator, that one or more of the plurality of condition determinations indicates that the condition is not met; and denying access to the quantum resource.

10. The method of claim 1 further comprising:

determining, by the quantum resource validator, based on the particular contract, a validation threshold;

determining, by the quantum resource validator, that one or more of the plurality of condition determinations indicates that the condition is not met;

determining, by the quantum resource validator, that one or more of the plurality of condition determinations indicates that the condition is met; and based at least in part on the validation threshold and the one or more of the plurality of condition determinations that indicate that the condition is met, granting access to the quantum resource.

11. A quantum computing system, comprising:

a memory; and a processor device coupled to the memory to:

determine, by a quantum resource validator, that a quantum process seeks access to a quantum resource implemented by the quantum computing system;

determine, by the quantum resource validator, that a particular contract of a plurality of contracts governs access to the quantum resource, the particular contract identifying a condition of the quantum computing system that is to be met prior to granting access to the quantum resource, wherein determining that the particular contract of the plurality of contracts governs access to the quantum resource comprises accessing a data structure that correlates ones of a plurality of quantum resources to ones of the plurality of contracts;

send, by the quantum resource validator to a plurality of computing devices, information indicating that the quantum process seeks access to the quantum resource;

receive, by the quantum resource validator from the plurality of computing devices, a corresponding plurality of condition determinations, each condition determination indicating whether the condition is met; and grant or deny access to the quantum resource based at least in part on the plurality of condition determinations.

12. The quantum computing system of claim 11 wherein to grant or deny access to the quantum resource based at least in part on the plurality of condition determinations, the processor device is further to:

determine that each condition determination of the plurality of condition determinations indicates that the condition is met; and grant access to the quantum resource.

13. The quantum computing system of claim 11 wherein to grant or deny access to the quantum resource based at least in part on the plurality of condition determinations, the processor device is further to:

determine that one or more of the plurality of condition determinations indicates that the condition is not met; and deny access to the quantum resource.

14. The quantum computing system of claim 11 wherein the processor device is further to:

determine, based on the particular contract, a validation threshold;

determine that one or more of the plurality of condition determinations indicates that the condition is not met;

determine that one or more of the plurality of condition determinations indicates that the condition is met; and based at least in part on the validation threshold and the one or more of the plurality of condition determinations that indicate that the condition is met, grant access to the quantum resource.

15. A non-transitory computer-readable storage medium that includes executable instructions to cause a quantum computing system to:

determine, by a quantum resource validator, that a quantum process seeks access to a quantum resource implemented by the quantum computing system;

determine, by the quantum resource validator, that a particular contract of a plurality of contracts governs access to the quantum resource, the particular contract identifying a condition of the quantum computing system that is to be met prior to granting access to the quantum resource, wherein determining that the particular contract of the plurality of contracts governs access to the quantum resource comprises accessing a data structure that correlates ones of a plurality of quantum resources to ones of the plurality of contracts;

send, by the quantum resource validator to a plurality of computing devices, information indicating that the quantum process seeks access to the quantum resource;

receive, by the quantum resource validator from the plurality of computing devices, a corresponding plurality of condition determinations, each condition determination indicating whether the condition is met; and grant or deny access to the quantum resource based at least in part on the plurality of condition determinations.

16. The non-transitory computer-readable storage medium of claim 15 wherein to grant or deny access to the quantum resource based at least in part on the plurality of condition determinations, the instructions further cause the quantum computing system to:

determine that each condition determination of the plurality of condition determinations indicates that the condition is met; and grant access to the quantum resource.

17. The non-transitory computer-readable storage medium of claim 15 wherein to grant or deny access to the quantum resource based at least in part on the plurality of condition determinations, the instructions further cause the quantum computing system to:

determine that one or more of the plurality of condition determinations indicates that the condition is not met; and deny access to the quantum resource.

18. The non-transitory computer-readable storage medium of claim 15 wherein the instructions further cause the quantum computing system to:

determine, based on the particular contract, a validation threshold;

determine that one or more of the plurality of condition determinations indicates that the condition is not met;

determine that one or more of the plurality of condition determinations indicates that the condition is met; and based at least in part on the validation threshold and the one or more of the plurality of condition determinations that indicate that the condition is met, grant access to the quantum resource.

* * * * *